United States Patent [19]
Caserta et al.

[11] Patent Number: 5,727,494
[45] Date of Patent: Mar. 17, 1998

[54] AMPHIBIOUS VEHICLE

[76] Inventors: Anthony L. Caserta; Charles W. Caserta, both of 10 Van Wyck La., Huntington, N.Y. 11743

[21] Appl. No.: 721,134

[22] Filed: Sep. 26, 1996

[51] Int. Cl.$^6$ .................................................. B63B 35/00
[52] U.S. Cl. ............................................ 114/270; 114/344
[58] Field of Search ................................ 114/270, 344

[56] References Cited

U.S. PATENT DOCUMENTS

| | | | |
|---|---|---|---|
| 1,579,943 | 4/1926 | Johnson | 114/270 |
| 2,628,792 | 2/1953 | Griffith. | |
| 2,908,241 | 10/1959 | Todd | 114/270 |
| 3,114,347 | 12/1963 | Trippel | 114/270 |
| 3,280,785 | 10/1966 | Mycroft | 114/270 |
| 3,446,175 | 5/1969 | Boehler et al.. | |
| 3,584,592 | 6/1971 | Perrine. | |
| 3,765,368 | 10/1973 | Asbeck | 114/270 |
| 4,241,686 | 12/1980 | Westphalen | 114/270 |
| 4,958,584 | 9/1990 | Williamson | 114/270 |
| 5,181,478 | 1/1993 | Berardi | 114/270 |
| 5,570,653 | 11/1996 | Gere et al. | 114/270 |

*Primary Examiner*—Jesus D. Sotelo
*Attorney, Agent, or Firm*—Collard & Roe, P.C.

[57] ABSTRACT

An amphibious vehicle capable of operation on both land and in water, comprising a cockpit body and floats attached to the cockpit body to keep the vehicle afloat while in the water. The floats comprise either a plurality of pontoons or a hull comprised of a plurality of longitudinally extending mini-hulls. The vehicle has a plurality of retractable wheels mounted to the cockpit body for operating the vehicle on land. The vehicle includes apparatus for retracting and deploying the wheels such that in the retracted position, the wheels are raised above the water line of the vehicle and in the deployed position, at least a portion of each wheel is disposed below the bottom surface of the float means. This way, the vehicle may be operated in the water without the wheels contacting the surface of the water, and also on land without the bottom of the floats contacting the land. The vehicle is powered by an engine coupled to a retractable propeller drive for propelling the vehicle through the water and coupled to a transmission which transfers power to the front wheels for land operation. The vehicle is equipped with a steering device coupled to the front wheels and propeller drive for steering the vehicle both through water and on land. A braking mechanism is coupled to the wheels for stopping the vehicle during land operation.

42 Claims, 7 Drawing Sheets

AMPHIBIOUS VEHICLE

BACKGROUND OF THE INVENTION

1. Field of the Invention

This invention relates to an amphibious vehicle capable of operation on land and in the water. In particular, the invention is a passenger vehicle that can easily transfer between water operation and land operation, without significant stopping or mechanical adjustments. The vehicle has varying wheel/float means spacial vertical positioning for both land operation and water operation. In the preferred embodiment, the wheels are raised when the vehicle is operating in water and are lowered as the vehicle approaches a landing point, and are capable of bringing the vehicle out of the water and carrying it on land. The vehicle also has an engine capable of propelling the vehicle both in land and on water, and has a steering means that is capable of steering the vehicle both in the water and on land.

2. The Prior Art

Vehicles capable of both land and water operation, also called "amphibious" vehicles, are known. Previous attempts to construct amphibious vehicles have encountered many problems. The prior art vehicles are mainly hull based-created by adding a hull to a land-based automotive type vehicle, or adding automotive features to a hull-based boat. The disadvantages of this type of vehicle are many. For example, many of the previous vehicles, such as shown in U.S. Pat. No. 4,958,584, were overweight, using heavy steel for the hull sections. Many, such as that described in U.S. Pat. No. 3,765,368, were unstable, due to a high center of gravity created by the hull. Many of the previous vehicles required extensive complicated machinery, such as separate motors for the land and water based travel, and were not capable of achieving high speeds in water due to a large amount of drag created by the design of the hull and wheels. In addition, hulled vehicles require the addition of costly and complex ventilation equipment to remove dangerous contained engine fumes.

SUMMARY OF THE INVENTION

It is therefore an object of the present invention to provide a motorized, amphibious vehicle that is capable of achieving high speeds both in water and on land.

It is another object to provide an amphibious vehicle that is stable during operation.

It is a further object of the present invention to provide an amphibious vehicle that is relatively simple in design and inexpensive to construct and operate.

These and other objects of the present invention are achieved by an amphibious passenger vehicle capable of operation on both land and in water, comprising a cockpit body with a float means disposed along the bottom surface of the cockpit body. The float means is preferably a plurality of pontoons, wherein the pontoons are arranged in the direction of travel and keep the vehicle afloat while in the water. Alternatively, the float means is comprised of a hull comprised of a plurality of longitudinally-extending mini hulls integrally formed with the vehicle. The vehicle has a plurality of retractable wheels mounted to the cockpit body for carrying the vehicle on land. Two of the wheels are mounted near the front end of the cockpit body on either side of the cockpit. The vehicle includes means for retracting and deploying the wheels such that in the retracted position, the wheels are raised above the water line and in the deployed position, at least a portion of each wheel is disposed below the bottom surface of the float means. In another embodiment, the pontoons are also retractable. This way, the vehicle may be operated in the water without the wheels contacting the surface of the water, and also on land without the bottom of the float means contacting the land.

The wheels are kept in place during operation by a plurality of locking elements capable of locking the wheels in both the retracted and deployed positions.

The vehicle is powered by an engine coupled to a retractable propeller drive for propelling the vehicle through the water. The propeller drive may include a means for moving the propeller drive between a deployed and retracted position so that the propeller drive may be submerged in the water for driving the vehicle through the water, and also raised up so that it does not contact the land while the vehicle is on land. Alternatively, one or more hydraulic, electrical, mechanical or jet drives may be used in place of a propeller drive.

The vehicle is equipped with steering means coupled to the front wheels and propeller drive for steering the vehicle both through water and on land, and transmission means coupling the engine to the front wheels for driving the vehicle while on land and for moving the vehicle in a forward and reverse direction. A braking mechanism is coupled to all of the wheels for stopping the vehicle during land operation.

The engine, transmission, steering and braking mechanisms may be of any kind known in the art. Typically, an automotive engine is used, preferably a gasoline-powered engine. In this case, the vehicle is also equipped with a fuel assembly comprising a fuel tank, fuel pump, fuel line and carburetor or fuel injector, for feeding the gasoline to the engine.

The wheels and/or pontoons may be retracted and deployed using either an electrically or hydraulically-powered mechanism. The vehicle may also be equipped with automobile and boating lights so that it may be safely operated in the dark. In a preferred embodiment, four wheels are used, the front two wheels being connected to the engine and steering mechanisms. All four wheels are connected to the braking mechanism.

In the preferred embodiment, the wheels may be retracted so that the lowest point of the wheels is at least four inches above the water line. This distance is necessary to keep the wheels from creating drag while the vehicle is in the water. In the deployed position, the lowest point of the wheels is preferably at least eight to twelve inches below the bottom surface of the float means. This distance varies with the length of the vehicle and is necessary to keep the float means from scraping the ground while the vehicle is operated on land.

As an alternative float means to the pontoon members, a catamaran or trimaran hull may be used. The hull is preferably formed from fiberglass and comprises a plurality of longitudinally extending mini-hulls integrally formed with and extending along the bottom surface of the hull.

During land operation, the vehicle of the present invention is capable of travelling at speeds of 0–100 miles per hour in the forward direction, and 0–30 miles per hour in the reverse direction. During water operation, the vehicle is capable of travelling from 0–40 miles per hour in the forward direction and 0–10 miles per hour in the reverse direction.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 10:
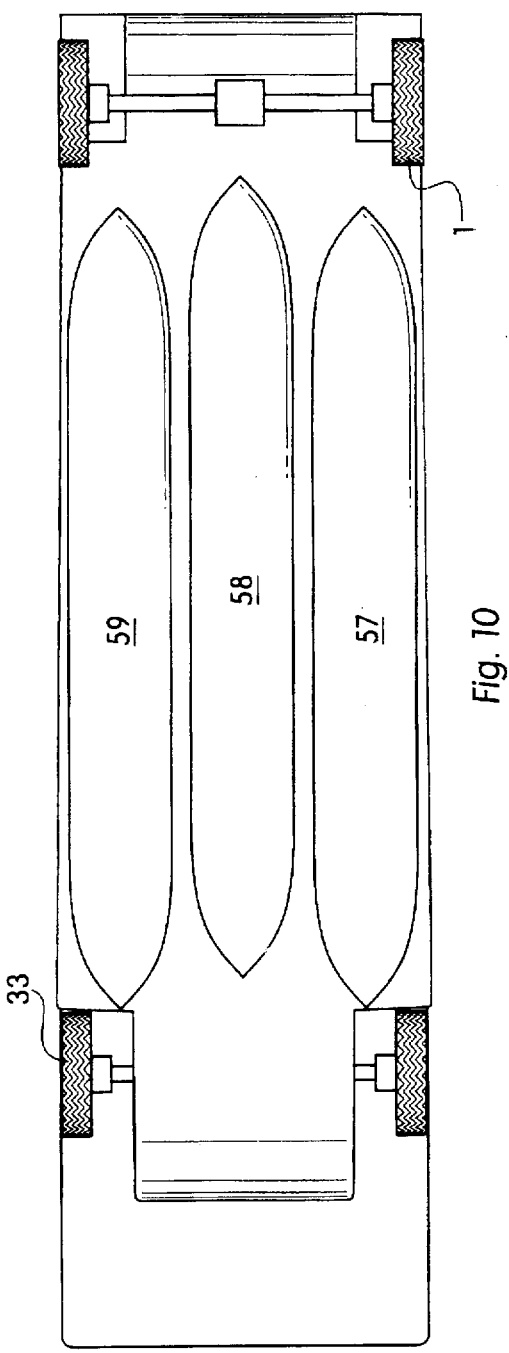
FIG. 10 is a bottom view of the embodiment of the vehicle having pontoons as the float means.

Turning now in detail to the drawings, and in particular FIGS. 1-3 and 5, there are shown side views of the vehicle of the present invention. The vehicle comprises a cockpit body 100 which holds the passengers and the driver. Cockpit body 100 has a floor 39 below which truss structure 37 is mounted. Three pontoons 57-59 are attached underneath cockpit body 100 to truss structure 37 with lateral braces 38. In an alternative embodiment, the truss structure is located within pontoons 57-59, to further reduce the water drag. Pontoons 57-59 are elongated and arranged in the direction of travel, as shown in FIG. 10. Pontoons 57-59 keep the vehicle afloat and provide stability to the vehicle during water operation.

Front wheels 1 and rear wheels 33 are retractably mounted to the vehicle for land operation. Seats 43 and 44 are placed within the inner cavity of cockpit body 100 for seating passengers and the driver. Cockpit body 100 has one or more gates 42 on one or both of its sides or at the front or rear of the cockpit for allowing passengers to enter and exit the vehicle.

Figure 1:
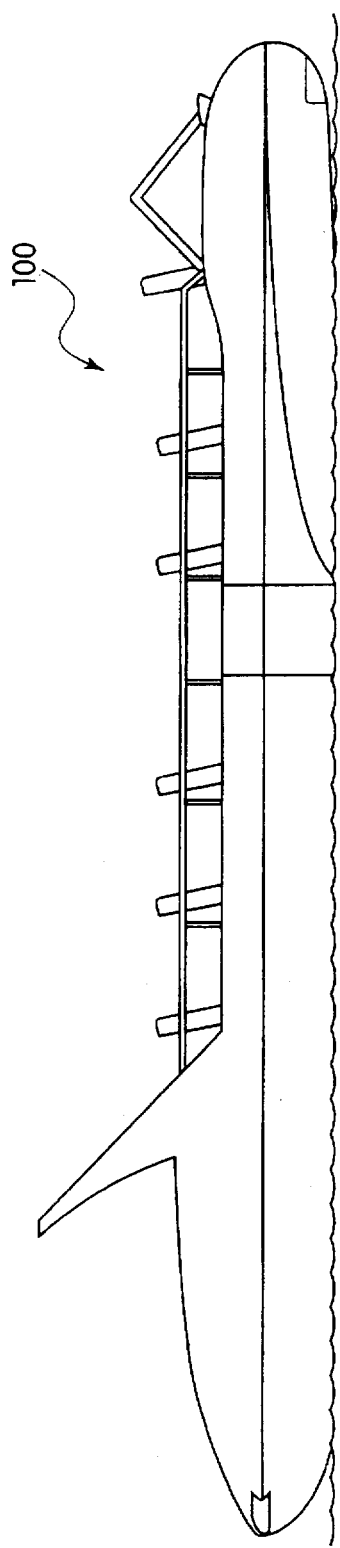
FIG. 1 is side view of the present invention as it is used for water travel.
Figure 2:
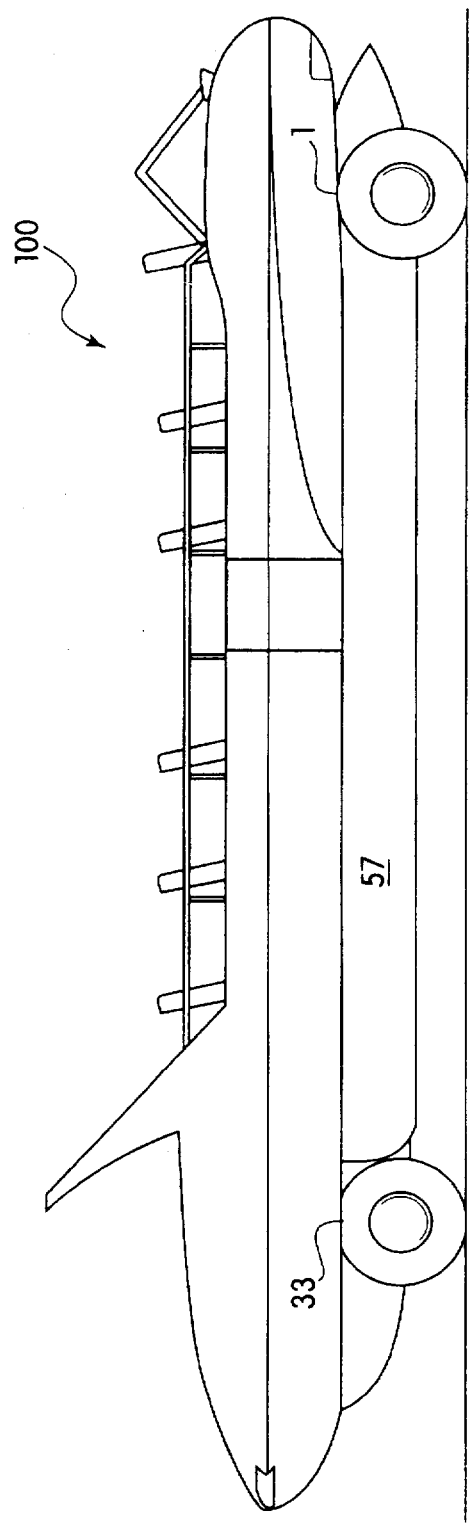
FIG. 2 is a side view of the embodiment of FIG. 1 with the wheels deployed in the land-travel mode.
Figure 3:
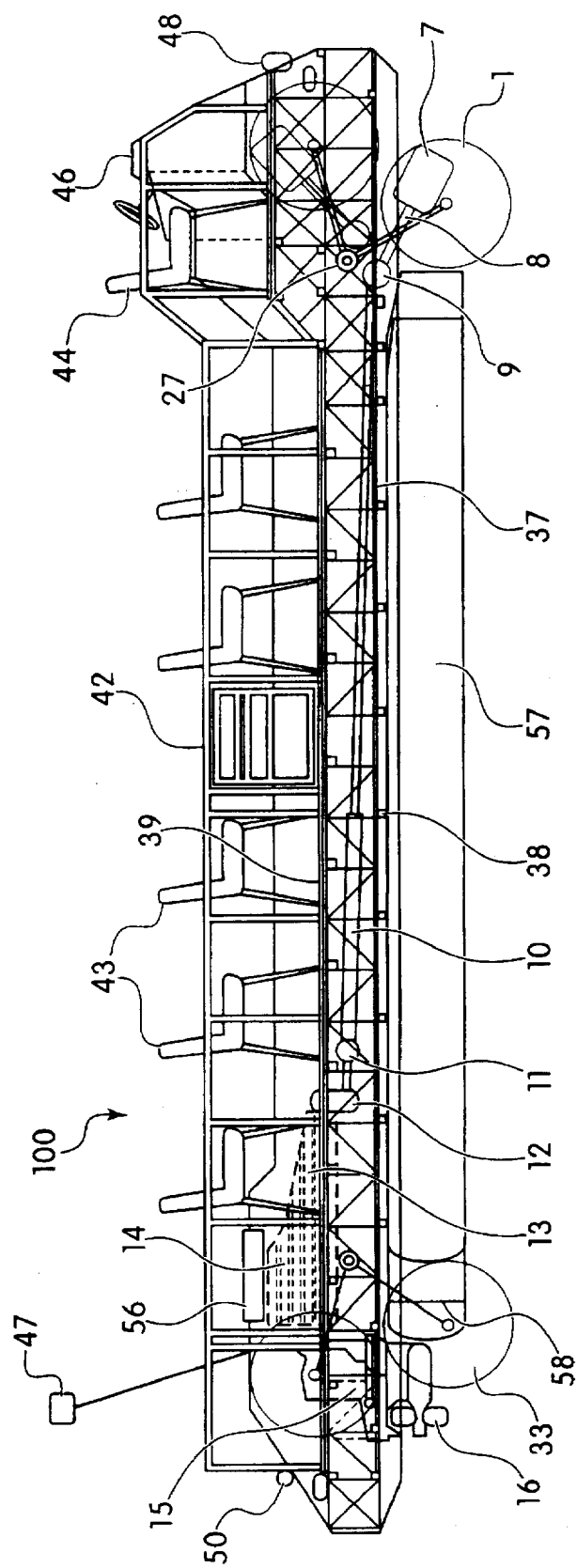
FIG. 3 is a side view of the internal mechanisms of the present invention showing the wheels in both the retracted and deployed positions.
Figure 8:
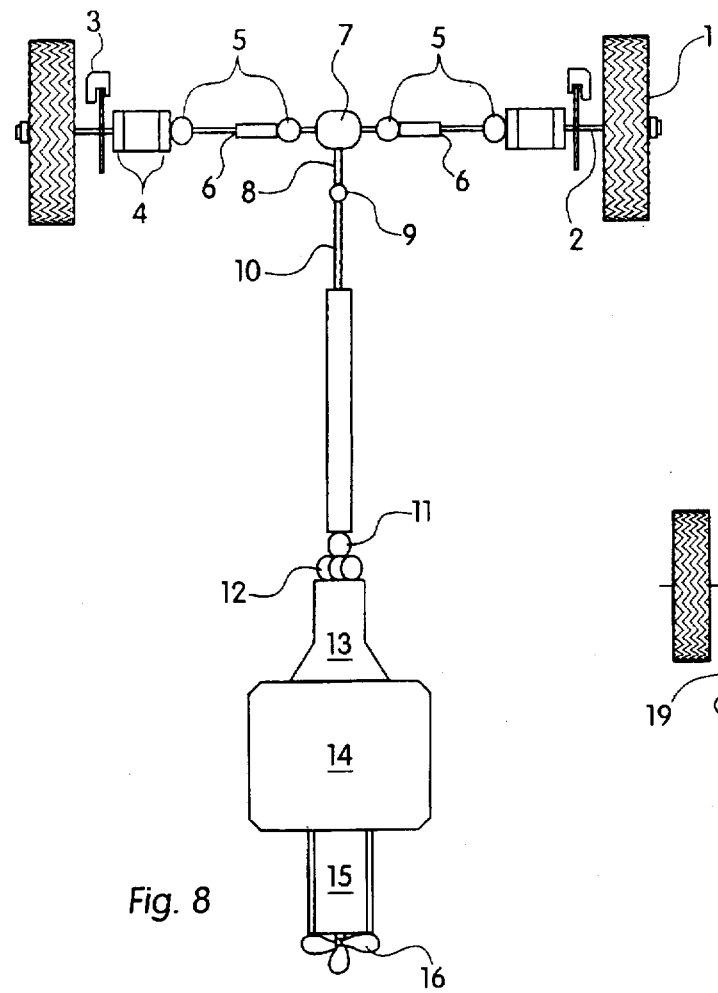
FIG. 8 is a top view of the preferred embodiment of the engine, propeller, transmission and braking assemblies of the present invention.

The vehicle is powered by engine 14, mounted near the rear of cockpit 100. As can be seen in FIG. 8, engine 14 is connected to transmission 13, located directly in front of engine 14. The output of transmission 13 is connected to vertical parallel gear box 12, which is located below the flooring 39 of cockpit 100 but above the pontoons, as shown in FIG. 3. Gear box 12 is connected to rear main CV joint 11, which transfers the power from the transmission to a main telescoping drive shaft 10. Drive shaft 10 extends to the front of the vehicle under the flooring 39 of cockpit 100.

Drive shaft 10 telescopes to accommodate changes in the length of the vehicle due to flexing, thermal expansion and the retraction and deployment of the wheels.

Drive shaft 10 is connected to front main CV joint 9, which transfers the power to differential drive shaft 8 and then to differential 7. Front main CV joint 9 is adapted to accommodate a misalignment angle of between 15 and 45 degrees between main telescoping drive shaft 10 and differential drive shaft 8, depending on whether the wheels are in the deployed or retracted position. When the wheels are in the retracted position, it is recommended that the gears of the transmission be shifted to neutral to lower the stress placed on front main CV joint 9. Mechanisms for automatic shifting to neutral upon retraction of the wheels may also be added.

Differential 7 contains standard pinion, ring and side gears which enable front wheels 1 to turn at slightly different speeds as the vehicle turns corners. The output from differential 7 is transferred to rotating front wheel shafts 2 via front telescoping drive shafts 6. Front telescoping drive shafts 6 are connected by front CV joints 5 at one end to differential 7 and at a second end to front wheel flange bearings 4, which maintain dimensional stability under various types and magnitudes of design loads.

Front wheel flange bearings 4 are attached to rotating front wheel shafts 2, which in turn are attached to front wheels 1. Front wheels 1 and rear wheels 33 are each preferably 7.62 inches wide, have a 30.5 inch diameter and are each adapted to 3050 pounds of load carrying capacity when pressurized to 80 psi.

Brake caliper sub assembly 3, as shown in FIG. 8, is attached to rotating wheel shafts 2 on all of the wheels and serves to stop the vehicle while on land. Brake caliper sub assembly 3 is activated by oil pressure coming from a brake master cylinder and a power booster assembly (not shown) which transfers mechanical pressure from a brake pedal to hydraulic oil pressure, which is then transferred to the brake caliper sub assembly 3 through brake lines. The braking system is similar to that used in conventional automobiles, buses and trucks, except that the hydraulic lines must be modified to accommodate the retraction and deployment of the wheels. These brake lines are similar to those used in motorcycles and airplanes. The braking master cylinder is divided into two sections, one for the front wheels and one for the rear wheels. In an alternative embodiment, air brakes may be used. Brake pressure is preferably distributed to the wheels based on the center of gravity of the vehicle to minimize skidding.

For water travel, the vehicle is equipped with an inboard/outboard unit 15, which is mounted at the rear of cockpit 100, as shown in FIG. 3. As shown in FIGS. 3 and 8, inboard/outboard unit 15 receives power from engine 14, to which it is connected. Inboard/outboard unit 15 is retractable so that it stays above the ground level during land use. Propeller assembly 16 is attached to the bottom of inboard/outboard unit 15, and is submerged in the water during water travel. Power from engine 14 is transferred through inboard/outboard unit 15 to propeller assembly 16 to move the vehicle through the water. Alternatively, jet drives, hydraulic drives, electric drives or other types of mechanical drives may be used to power the vehicle through the water.

Figure 9:
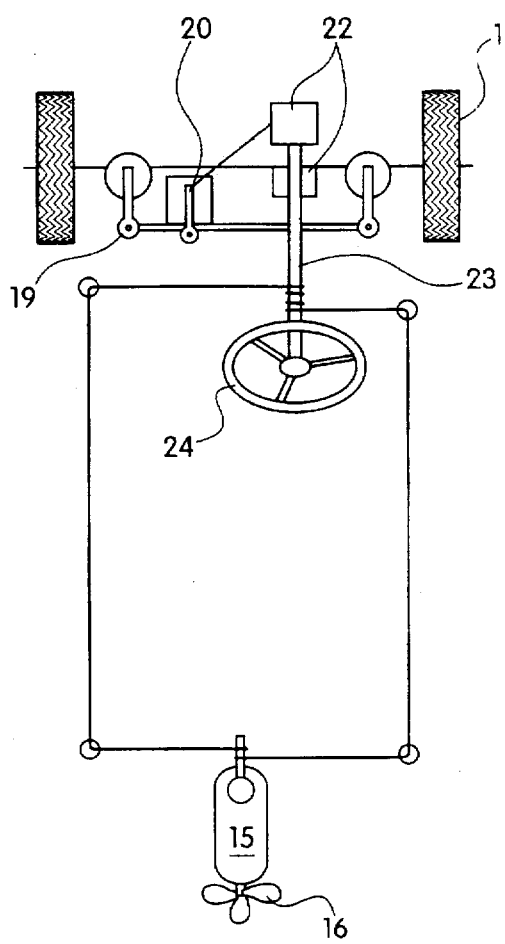
FIG. 9 is a top view of the steering assembly of the present invention.

As shown in FIG. 9, steering of the vehicle is achieved with steering wheel 24, which steers the vehicle in the direction that steering wheel 24 is turned. Steering wheel 24 is connected to steering shaft 23, which in turn is connected to steering fixed gear box 22. Steering fixed gear box 22 is telescopically connected to moving gear box 20, so that steering is achieved whether the wheels are in the deployed or retracted position. Moving gear box 20 is connected to vertical steering rods 19, which turn front wheels 1.

To steer during water operation, steering shaft 23 is connected to either a mechanical cable drive system or a hydraulic drive system, which is then connected to a rudder system located on the inboard/outboard unit near propeller 16 to provide turning control. Alternatively, a hydraulic steering system may be used.

Figure 6:
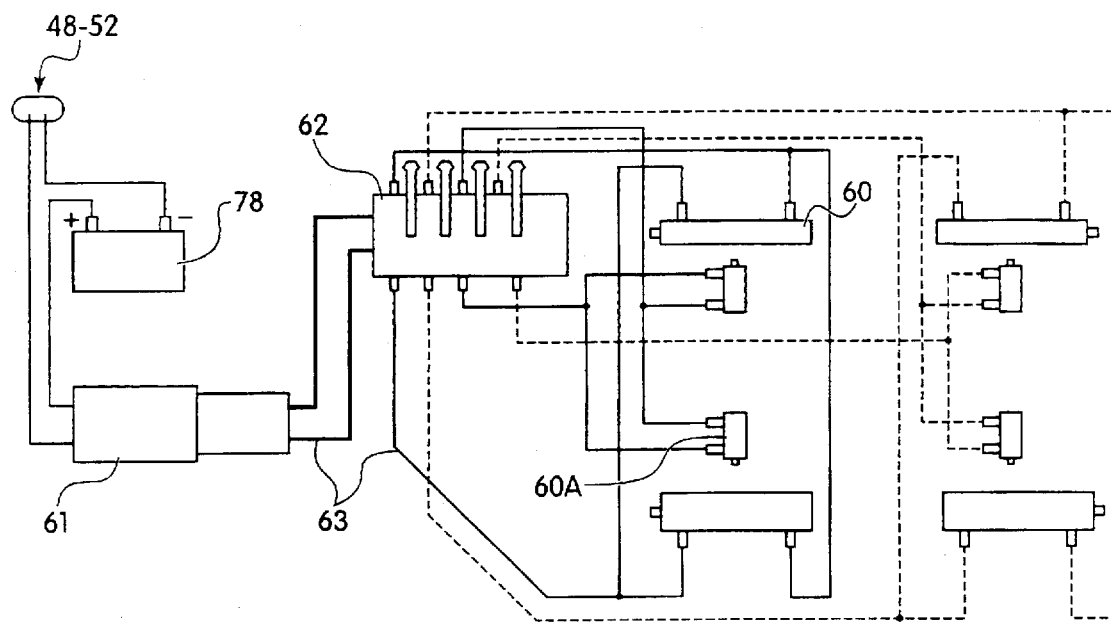
FIG. 6 is a schematic drawing of the wheel retraction and deployment means.
Figure 7:
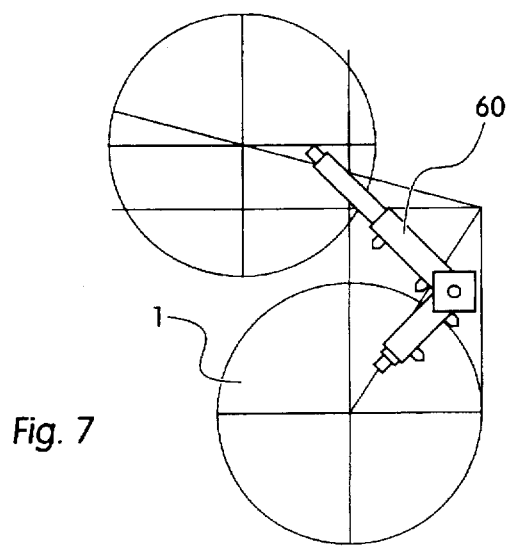
FIG. 7 is a side view of the wheel retraction and deployment means.

The wheel deployment and retraction means is shown in FIGS. 6 and 7. Locking cylinders 60a are used to keep the wheels stationary in the selected deployed or retracted position. To deploy or retract the wheels, the operator first unlocks locking cylinders 60A and activates a hydraulic control valve assembly 62, which is connected to a hydraulic pump-motor assembly 61 by hydraulic lines 63. Hydraulic control valve assembly 62 transfers pressure from the hydraulic pump-motor assembly to the hydraulic or mechanical actuating cylinder 60, which moves the wheels between the deployed and retracted positions. Once the desired position of the wheels is achieved, locking cylinders 60a are re-locked to keep the wheels stationary.

As shown in FIG. 3, Engine cooling assembly 56 is located directly above engine 14 and allows for cooling of engine 14 and dispersion of engine fumes. Engine cooling assembly 56 comprises an air inlet, a radiator and a circulating water pump.

Figure 4:
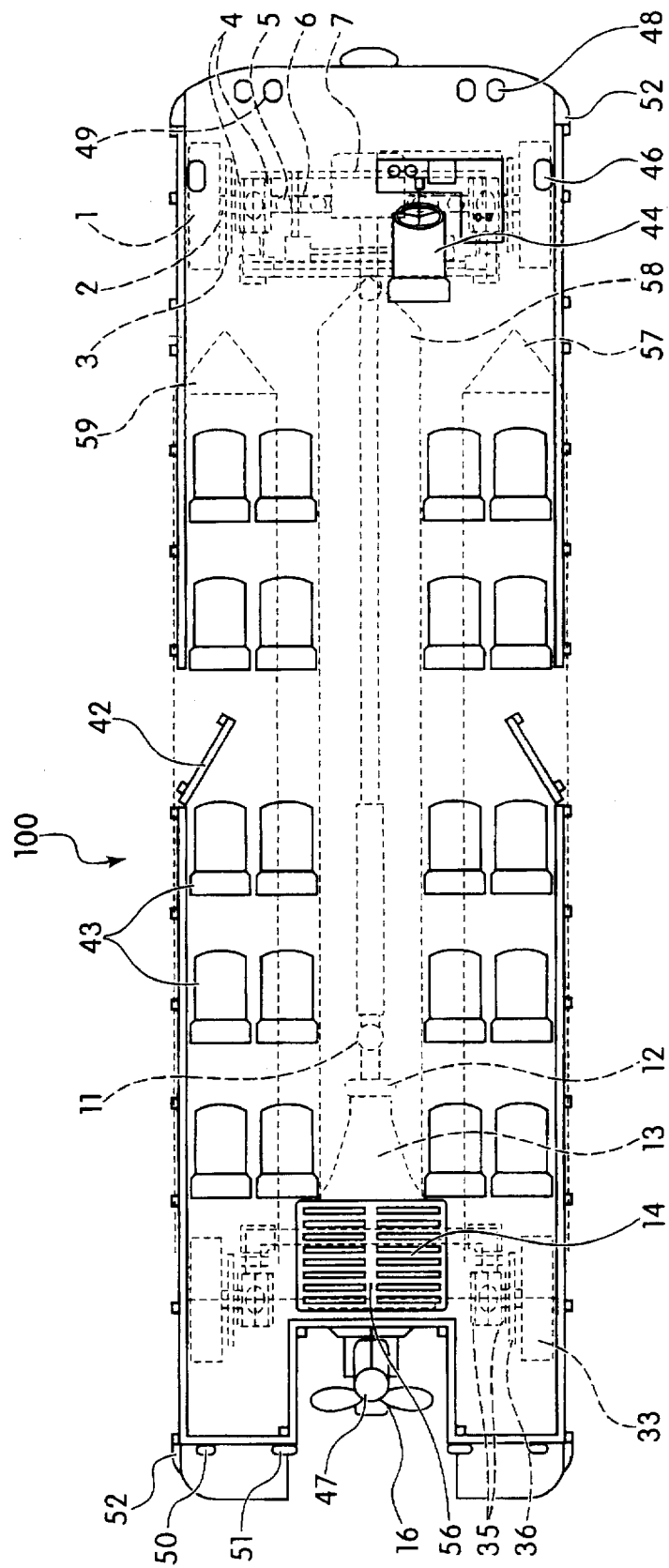
FIG. 4 is a top view of the present invention.
Figure 5:
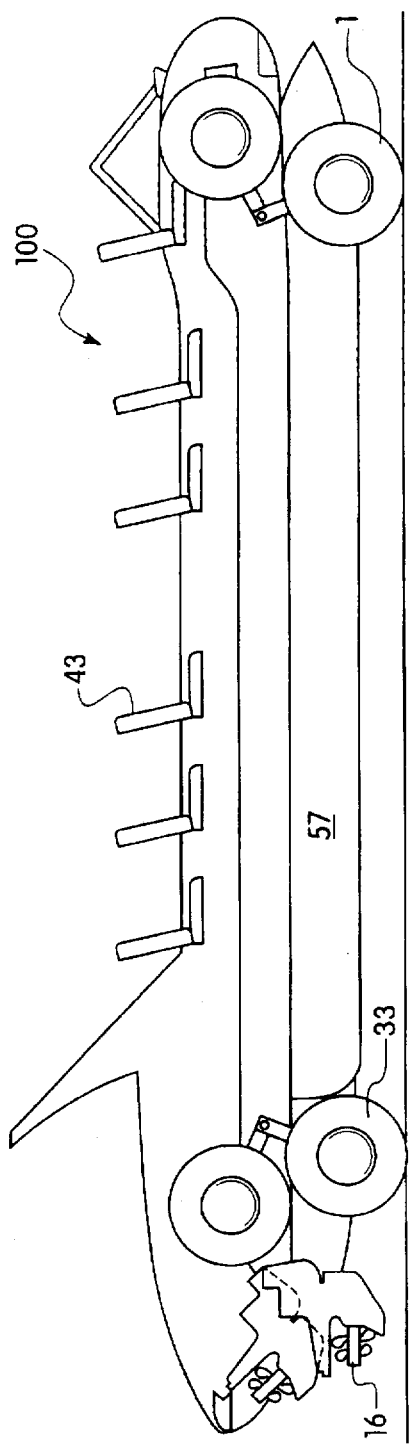
FIG. 5 is a side view of another embodiment of the present invention, showing the retraction and deployment of the wheels and propeller.

As shown in FIG. 4, the vehicle is equipped with mast head light 47, headlights 48, high beams 49, red and green running lights 46, stoplights 50, backup lights 51 and blinkers 52 for nighttime operation both on land and in the water. All of the lights are connected to battery 78, seen schematically in FIG. 6.

Figure 11:
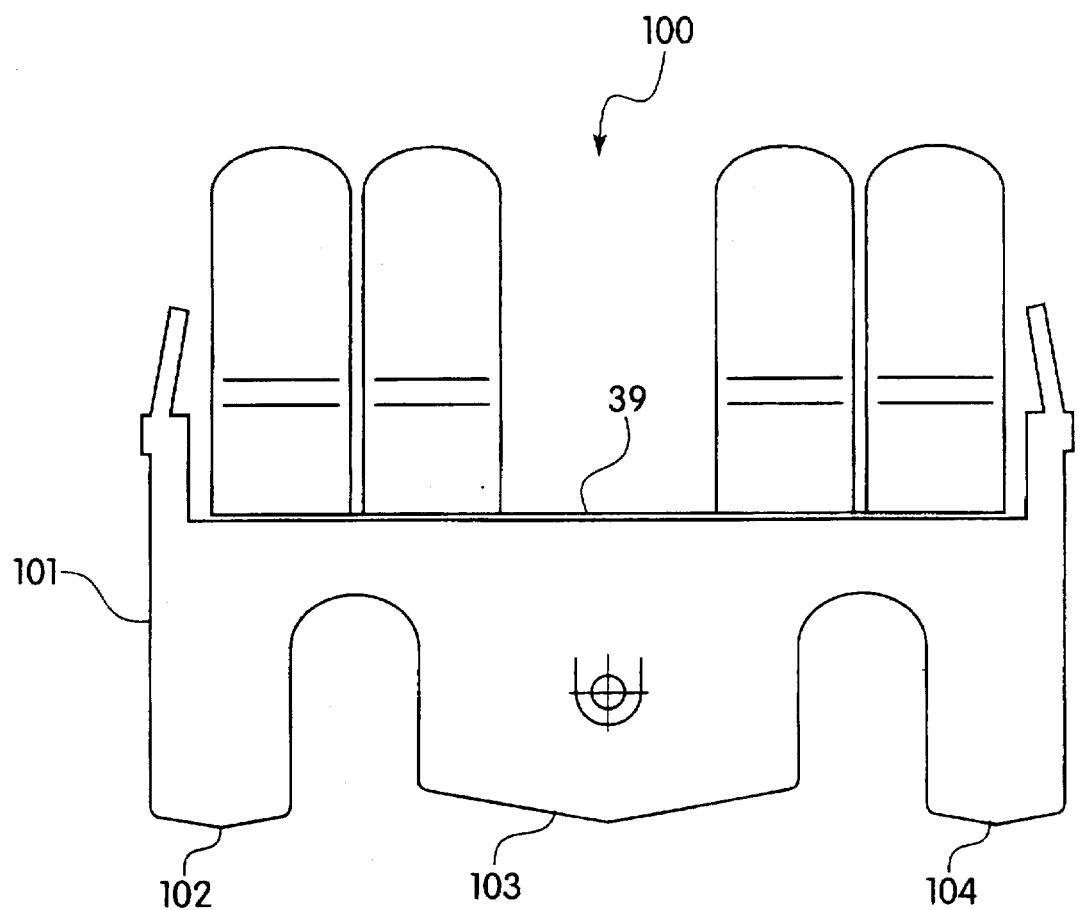
FIG. 11 is a cross-sectional view of the embodiment of the vehicle having a hull with three mini-hulls as the float means.

FIG. 11 shows the float means of the vehicle as a trimaran hull. Hull 101 comprises a plurality of longitudinally-extending integrally formed mini-hulls 102-104 on the bottom surface of hull 101. Hull 101 is attached to cockpit body 100, or may be integrally formed with cockpit body 100. The mini-hulls serve to keep the vehicle afloat and stable while it is in the water.

The vehicle of the present invention can be designed to hold between 1 and 40 passengers, and can be configured as a special purpose vehicle such as a fire boat, ambulance, harbor patrol vehicle, motor home, private recreational vehicle or as a truck transport vehicle for transporting up to 5 tons of material.

Accordingly, while only several embodiments of the present invention have been shown and described, it is obvious that many changes and modifications may be made thereunto without departing from the spirit and scope of the invention.

What is claimed is:

1. An amphibious vehicle capable of operation both on land and in water, comprising:

a cockpit body having an inner cavity, side walls, a front end, a rear end and a bottom surface;

float means comprising a plurality of elongated pontoons disposed along the bottom surface of the cockpit body, said pontoons each having an elongated axis and a bottom surface for contacting the water, and wherein the elongated axis of the pontoons is arranged parallel to the direction of travel, and wherein said pontoons are capable of keeping the vehicle afloat while in the water and defining a water line for the vehicle;

a plurality of wheels mounted to the cockpit body for carrying the vehicle on land, wherein two wheels are mounted one on each side of the cockpit body near the front end of the cockpit body;

means for retracting and deploying the wheels such that in the retracted position, the wheels are raised above the water line of the vehicle so that the vehicle may be operated in the water without the wheels contacting the surface of the water, and in the deployed position, at least a portion of each wheel is disposed below the bottom surface of the pontoons, so that the wheels will contact land and prevent the bottom of the pontoons from contacting the land;

a plurality of locking elements capable of locking the wheels in both the retracted and deployed positions;

an engine having a first end and a second end, the first end coupled to a water drive for propelling the vehicle through the water;

steering means coupled to the front wheels and water drive for steering the vehicle both through water and on land;

transmission means coupled to the second end of the engine for coupling the engine to the front wheels, driving the vehicle while on land and moving the vehicle in a forward and reverse direction; and a braking mechanism coupled to the wheels for stopping the vehicle during land operation.

2. The vehicle of claim 1, wherein the water drive is a propeller assembly.

3. The vehicle of claim 1, wherein the water drive is a jet driving assembly.

4. The vehicle of claim 1, wherein there are four wheels, two wheels mounted near the front end, one on each side of the cockpit body, and two wheels mounted near the rear end, one on each side of the cockpit body.

5. The vehicle of claim 1, wherein the means for retracting and deploying the wheels is an electrically-powered mechanism.

6. The vehicle of claim 1, wherein the means for retracting and deploying the wheels is a hydraulically-powered mechanism.

7. The vehicle of claim 6 wherein the hydraulically-powered mechanism comprises:

hydraulic control levers adapted to send signals to a hydraulic control valve assembly;

a hydraulic pump-motor assembly connected to the hydraulic control valve assembly for generating hydraulic pressure;

hydraulic actuating cylinders each having a moving arm for moving the wheels;

hydraulic lines connecting the actuating cylinders to the hydraulic control valve assembly; such that an operator may retract and deploy the wheels through the use of the hydraulic control levers.

8. The vehicle of claim 1, wherein the lowest points of the wheels in the retracted position are located at least four inches above the water line of the vehicle and wherein the lowest points of the wheels in the deployed position are located at least eight to twelve inches below the bottom surface of the float means.

9. The vehicle of claim 1, further comprising automotive and boating lights for operating the vehicle in the dark.

10. The vehicle of claim 1, further comprising a truss structure located on the bottom surface of the cockpit body, and wherein the pontoons are mounted to the truss structure.

11. The vehicle of claim 1 further comprising a truss structure located within the pontoons and mounted to the cockpit body.

12. The vehicle of claim 1, wherein the engine is a gasoline fuel driven automotive engine and wherein the fuel is supplied to the engine through an assembly comprising a fuel pump, a gas tank, a fuel filter, a fuel line and a carburetor or fuel injector, said assembly being mounted within the cockpit body.

13. The vehicle of claim 1, wherein the steering means comprises:

a steering wheel;

a shaft connected at a first end to the steering wheel and connected at a second end to a fixed gear box;

a telescoping shaft connected at a first end to the fixed gear box and at a second end to a moving gear box;

a plurality of tie rods connected at first ends to the moving gear box and at second ends to a plurality of vertical steering rods for turning the front wheels;

a drive system connected to the shaft;

a rudder system connected to the drive system for steering the boat while it is in the water, such that turning the steering wheel turns both the rudder system and the front wheels and enables steering of the vehicle both while on land and in the water.

14. The vehicle of claim 1 wherein the steering is accomplished through a hydraulic steering drive mechanism.

15. The vehicle of claim 1 wherein the steering is accomplished through an electric steering drive mechanism.

16. The vehicle of claim 1, wherein there are at least two pontoons.

17. The vehicle of claim 1, wherein the transmission means is an automatic transmission unit with a torque of between 200 and 500 foot lbs. and a gear ratio of from 2 to 3.

18. The vehicle of claim 1, further comprising means for automatically shifting the transmission means into neutral gear while the wheels are being retracted or deployed.

19. The vehicle of claim 1, further comprising means for cooling the engine and dispersing fumes from the engine.

20. The vehicle claim 1 wherein the braking mechanism delivers a percentage of the braking power to the front wheels and rear wheels based upon the center of gravity of the vehicle.

21. The vehicle of claim 1 further comprising means for moving the water drive between a deployed and retracted position, wherein in the deployed position, the water drive may be submerged in the water for driving the vehicle through the water, and wherein in the retracted position, the water drive as raised up so that it does not contact the land while the vehicle is on land.

22. The vehicle of claim 1 further comprising means for retracting and deploying the pontoons.

23. An amphibious vehicle capable of operation both on land and in water, comprising:

a cockpit body having an inner cavity, side walls, a front end, a rear end and a bottom surface;

a hull attached to the cockpit body and having a bottom surface, said hull comprising a plurality of longitudinally-extending integrally formed mini-hulls that extend along the bottom surface of the hull;

wherein said hull is capable of keeping the vehicle afloat while in the water and defining a water line for the vehicle;

a plurality of wheels mounted to the cockpit body for carrying the vehicle on land, wherein two wheels are mounted one on each side of the cockpit body near the front end of the cockpit body;

means for retracting and deploying the wheels such that in the retracted position, the wheels are raised above the water line of the vehicle so that the vehicle may be operated in the water without the wheels contacting the surface of the water, and in the deployed position, at least a portion of each wheel is disposed below the bottom surface of the hull, so that the wheels will contact land and prevent the bottom of the hull from contacting the land;

a plurality of locking elements capable of locking the wheels in both the retracted and deployed positions;

an engine having a first end and a second end, the first end coupled to a water drive for propelling the vehicle through the water;

steering means coupled to the front wheels and water drive for steering the vehicle both through water and on land;

transmission means coupled to the second end of the engine for coupling the engine to the front wheels, driving the vehicle while on land and moving the vehicle in a forward and reverse direction; and a braking mechanism coupled to the wheels for stopping the vehicle during land operation.

24. The vehicle of claim 23 wherein there are two mini-hulls.

25. The vehicle of claim 23 wherein there are three mini-hulls.

26. The vehicle of claim 23, wherein the water drive is a propeller assembly.

27. The vehicle of claim 23, wherein the water drive is a jet driving assembly.

28. The vehicle of claim 23, wherein there are four wheels, two wheels mounted near the front end, one on each side of the cockpit body, and two wheels mounted near the rear end, one on each side of the cockpit body.

29. The vehicle of claim 23, wherein the means for retracting and deploying the wheels is an electrically-powered mechanism.

30. The vehicle of claim 23, wherein the means for retracting and deploying the wheels is a hydraulically-powered mechanism.

31. The vehicle of claim 30, wherein the hydraulically-powered mechanism comprises:

hydraulic control levers adapted to send signals to a hydraulic control valve assembly;

a hydraulic pump-motor assembly connected to the hydraulic control valve assembly for generating hydraulic pressure;

hydraulic actuating cylinders each having a moving arm for moving the wheels;

hydraulic lines connecting the actuating cylinders to the hydraulic control valve assembly; such that an operator may retract and deploy the wheels through the use of the hydraulic control levers.

32. The vehicle of claim 23, wherein the lowest points of the wheels in the retracted position are located at least four inches above the water line of the vehicle and wherein the lowest points of the wheels in the deployed position are located at least eight to twelve inches below the bottom surface of the hull.

33. The vehicle of claim 23, further comprising automotive and boating lights for operating the vehicle in the dark.

34. The vehicle of claim 23, wherein the engine is a gasoline fuel driven automotive engine and wherein the fuel is supplied to the engine through an assembly comprising a fuel pump, a gas tank, a fuel filter, a fuel line and a carburetor or fuel injector, said assembly being mounted within the cockpit body.

35. The vehicle of claim 23, wherein the steering means comprises:
- a steering wheel;
- a shaft connected at a first end to the steering wheel and connected at a second end to a fixed gear box;
- a telescoping shaft connected at a first end to the fixed gear box and at a second end to a moving gear box;
- a plurality of tie rods connected at first ends to the moving gear box and at second ends to a plurality of vertical steering rods for turning the front wheels;
- a drive system connected to the shaft;
- a rudder system connected to the drive system for steering the boat while it is in the water, such that turning the steering wheel turns both the rudder system and the front wheels and enables steering of the vehicle both while on land and in the water.

36. The vehicle of claim 23, wherein the steering is accomplished through a hydraulic steering drive mechanism.

37. The vehicle of claim 23, wherein the steering is accomplished through an electric steering drive mechanism.

38. The vehicle of claim 23, wherein the transmission means is an automatic transmission unit with a torque of between 200 and 500 foot lbs. and a gear ratio of from 2 to 3.

39. The vehicle of claim 23, further comprising means for automatically shifting the transmission means into neutral gear while the wheels are being retracted or deployed.

40. The vehicle of claim 23, further comprising means for cooling the engine and dispersing fumes from the engine.

41. The vehicle claim of 23, wherein the braking mechanism delivers a percentage of the braking power to the front wheels and rear wheels based upon the center of gravity of the vehicle.

42. The vehicle of claim 23, further comprising means for moving the water drive between a deployed and retracted position, wherein in the deployed position, the water drive may be submerged in the water for driving the vehicle through the water, and wherein in the retracted position, the water drive is raised up so that it does not contact the land while the vehicle is on land.

* * * * *